(12) United States Patent
Denis et al.

(10) Patent No.: US 11,601,185 B2
(45) Date of Patent: Mar. 7, 2023

(54) METHOD FOR OPTIMIZING USER EQUIPMENT WIRELESS LOCALIZATION USING RECONFIGURABLE INTELLIGENT SURFACES, RELATED DEVICE AND COMPUTER PROGRAM

(71) Applicant: Commissariat à l'énergie atomique et aux énergies alternatives, Paris (FR)

(72) Inventors: Benoît Denis, Grenoble (FR); Henk Wymeersch, Gothenburg (SE)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 63 days.

(21) Appl. No.: 17/337,593

(22) Filed: Jun. 3, 2021

(65) Prior Publication Data
US 2021/0384958 A1 Dec. 9, 2021

(30) Foreign Application Priority Data

Jun. 5, 2020 (EP) .................................... 20305598

(51) Int. Cl.
*H04B 7/06* (2006.01)
*H01Q 15/00* (2006.01)
(Continued)

(52) U.S. Cl.
CPC ......... *H04B 7/0697* (2013.01); *H01Q 15/002* (2013.01); *H01Q 15/148* (2013.01); *H04B 7/0897* (2013.01); *H04B 7/145* (2013.01)

(58) Field of Classification Search
CPC .... H04B 7/145; H04B 7/0897; H04B 7/0697; H01Q 15/148; H01Q 15/002
See application file for complete search history.

(56) References Cited

U.S. PATENT DOCUMENTS

2021/0302561 A1* 9/2021 Bayesteh ................ G01S 13/42

OTHER PUBLICATIONS

European Search Report dated Nov. 3, 2020 in European Application 20305598.3 filed on Jun. 5, 2020, 8 pages (with Written Opinion).

(Continued)

*Primary Examiner* — Rahel Guarino
(74) *Attorney, Agent, or Firm* — Oblon, McClelland, Maier & Neustadt, L.L.P.

(57) ABSTRACT

A method for optimizing user equipment wireless localization using K reconfigurable intelligent surfaces reflecting signal(s) transmitted between a base station and the user equipment, the method including, whatever an a priori position of the user equipment selecting at least one reconfigurable intelligent surface to activate among the K reconfigurable intelligent surfaces, determining phases of elements of the at least one reconfigurable intelligent surface, by minimizing a predetermined cost function, depending on the a priori position, and accounting for a predetermined position error bound of the user equipment, while ensuring that at most K reconfigurable intelligent surfaces are selected, ensuring that the minimum Euclidian distance between two consecutive selected reconfigurable intelligent surfaces of a predetermined configuration, is strictly higher than a predetermined value limiting interference between additional multipath components generated by the at least one reconfigurable intelligent surface.

14 Claims, 5 Drawing Sheets

(51) Int. Cl.
     *H01Q 15/14*    (2006.01)
     *H04B 7/08*     (2006.01)
     *H04B 7/145*    (2006.01)

(56) References Cited

OTHER PUBLICATIONS

Huang et al., "Indoor Signal Focusing With Deep Learning Designed Reconfigurable Intelligent Surfaces", IEEE 20$^{th}$ International Workshop on Signal Processing Advances in Wireless Communications (SPAWC), Jul. 2, 2019, 5 pages.
Wymeersch et al., "Radio Localization and Mapping with Reconfigurable Intelligent Surfaces", arxiv.org, Dec. 19, 2019, 7 pages.

* cited by examiner

METHOD FOR OPTIMIZING USER EQUIPMENT WIRELESS LOCALIZATION USING RECONFIGURABLE INTELLIGENT SURFACES, RELATED DEVICE AND COMPUTER PROGRAM

BACKGROUND

Field

The present invention relates to a method for optimizing user equipment wireless localization using K reconfigurable intelligent surfaces, with K an integer such that $K \geq 1$, each reconfigurable intelligent surface comprising M elements controllable in phase, with M an integer such that $M \geq 1$, said K reconfigurable intelligent surfaces reflecting signal(s) transmitted between a base station and said user equipment.

The present invention also relates to a computer program comprising software instructions which, when executed by a computer, implement such a method for optimizing user equipment wireless localization using K reconfigurable intelligent surfaces, with K an integer such that $K \geq 1$.

The invention also relates to a device for optimizing user equipment wireless localization using K reconfigurable intelligent surfaces, with K an integer such that $K \geq 1$, each reconfigurable intelligent surface comprising M elements controllable in phase, with M an integer such that $M \geq 1$, said K reconfigurable intelligent surfaces reflecting signal(s) transmitted between a base station and said user equipment.

DESCRIPTION OF RELATED ART

The disclosure relates to wireless communications systems.

More specifically, the disclosure relates to a wireless localization technique. Indeed, accurate localization of user equipment, typically at the centimeter level, is suitable to contribute to achieve better communication performances such as higher data rates and higher network loads through advanced context-aware and location-assisted communication schemes. Moreover, accurate localization is also suitable to feed a variety of demanding applications, such as autonomous vehicles, advanced control-command for smart factories, human-machine interactions, immersive augmented/virtual reality, etc.

In addition, localization flexibility for offering tunable accuracy levels to selected groups of devices/users depending on the context, and localization resilience/continuity typically while operating in obstructed and/or crowded indoor environments represent two other challenging aspects of future wireless localization systems.

In this field of wireless localization, various solutions have been proposed to exploit multipath echoes as a meaningful source of information for indoor positioning, tracking, or mapping. However, even if these solutions make use of the multipath channel as a constructive source of information, the underlying electromagnetic interactions induced by the operating environment remain uncontrolled and as such, largely suboptimal from the localization point of view.

Recently, solutions based on reconfigurable intelligent surfaces (RIS) have been promoted, wherein surfaces are endowed with the capability to modify the impinging electromagnetic waves. However, the benefits from RIS-induced multipath components, in terms of the location-dependent information conveyed by the generated multipath is not systematic and could be severely harmed —or even annihilated—by side collateral effects such as extra multipath interference.

SUMMARY

The invention therefore aims to address the problems of optimizing the use of reconfigurable intelligent surfaces in a given environment to improve the performance of multipath-aided localization, and furthermore, whatever the user equipment position.

To this end, the object of the invention is a method for optimizing user equipment wireless localization using K reconfigurable intelligent surfaces, with K an integer such that $K \geq 1$, each reconfigurable intelligent surface comprising M elements controllable in phase, with M an integer such that $M \geq 1$, said K reconfigurable intelligent surfaces reflecting signal(s) transmitted between a base station and said user equipment, said method being implemented by an electronic device and said method comprising, whatever an a priori position of said user equipment (i.e, for any a priori position of said user equipment)

selecting at least one reconfigurable intelligent surface to activate among said K reconfigurable intelligent surfaces, determining phases of elements of said at least one reconfigurable intelligent surface to activate, by minimizing a predetermined cost function depending on said a priori position of said user equipment, said predetermined cost function accounting for a predetermined position error bound of said user equipment, while also respecting two constraints:

ensuring that at most K reconfigurable intelligent surfaces are selected, ensuring that the minimum Euclidian distance between two consecutive selected reconfigurable intelligent surfaces of a predetermined configuration of said K reconfigurable intelligent surfaces, is strictly higher than a predetermined value limiting interference between additional multipath components generated by said at least one reconfigurable intelligent surface.

According to particular embodiments, the method comprises one or more of the following characteristics, taken separately or in any technically feasible combination:

said determining of phases of elements and said selecting of said at least one reconfigurable intelligent surface to activate among said K reconfigurable intelligent surfaces are performed simultaneously by running a same optimization phase of said predetermined cost function;

said determining of phases of elements and said selecting of said at least one reconfigurable intelligent surface to activate among said K reconfigurable intelligent surfaces are performed separately and successively, said determining of phases of elements being first performed for at least one reconfigurable intelligent surface previously imposed to said electronic device taking into account said a priori position of said user equipment, said selecting being then performed by optimizing said predetermined cost function using the phases of elements previously determined;

said predetermined value is inversely proportional to a product of a predetermined fixed spacing between each reconfigurable intelligent surfaces of said K reconfigurable intelligent surfaces by a predetermined bandwidth of a signal to be reflected by said at least one reconfigurable intelligent surface selected among said K reconfigurable intelligent surfaces;

said predetermined cost function is based on first positioning performance indicators and/or metrics characterizing the quality of an upcoming position estimate of said user equipment based on at least one multipath component observed on the received signal and caused by said at least one selected reconfigurable intelligent surfaces, and belonging to the group comprising at least:
a function of a Fisher information,
a Cramer Rao lower bound,
a Ziv-Zakai bound,
a geometric dilution of precision;
said predetermined cost function is based on second positioning performance indicators and/or metrics characterizing the estimation of at least one or several intermediary location-dependent radio variables associated with at least one multipath component observed on the received signal and caused by said at least one selected reconfigurable intelligent surfaces, the said location-dependent radio variables belonging to the group comprising:
delay,
angle of arrival,
received power or amplitude;
said first positioning performance indicators, or respectively wherein said second positioning performance indicators, are approximated by injecting information representative of a latest known position of said user equipment;
said method further comprises:
activating said at least one selected reconfigurable intelligent surface and applying phases of elements provided by said determining of phases of elements of said at least one selected reconfigurable intelligent surface,
determining a new estimate of said user equipment position relying on at least one multipath location-dependent radio variables caused by said at least one selected reconfigurable intelligent surface with said provided phases of elements, and refining a latest known position of said user equipment with said new estimate of said user equipment position,
all steps of said method being reiterated until at least one predetermined stopping rule is reached;
said determining of a new estimate is based on determining location-dependent radio variables associated with at least one multiple multipath parameter out of signals received by said at least one selected reconfigurable intelligent surface belonging to the group comprising at least:
delay(s),
angle(s) of arrival,
received power,
and wherein said predetermined cost function depends on said at least one multiple multipath parameter;
said determining of a new estimate of said user equipment position relying on at least one multipath location-dependent radio variables, comprises performing one estimator belonging to the group comprising at least:
weighted least squares positioning,
Maximum likelihood positioning,
Maximum a posteriori positioning,
Bayesian filtering,
message-passing over factor-graphs;
said at least one predetermined stopping rule belongs to the group comprising at least:
reaching an a priori accuracy position target,
reaching an a priori maximum number of activated reconfigurable intelligent surfaces,
reaching an a priori maximum number of refinement iterations/steps of said method.

The invention also relates to a computer program comprising software instructions which, when executed by a computer, implement a method as defined above.

The invention also relates to an electronic device for optimizing user equipment wireless localization using K reconfigurable intelligent surfaces, with K an integer such that $K \geq 1$, each reconfigurable intelligent surface comprising M elements controllable in phase, with M an integer such that $M \geq 1$, said K reconfigurable intelligent surfaces reflecting signal(s) transmitted between a base station and said user equipment,
said electronic device being configured to, whatever an a priori position of said user equipment (i.e. for any a priori position of said user equipment):
select at least one reconfigurable intelligent surface to activate among said K reconfigurable intelligent surfaces,
determine phases of elements of said at least one reconfigurable intelligent surface to activate,
by minimizing a predetermined cost function depending on said a priori position of said user equipment, said predetermined cost function accounting for a predetermined position error bound of said user equipment,
while also respecting two constraints:
ensuring that at most K reconfigurable intelligent surfaces are selected,
ensuring that the minimum Euclidian distance between two consecutive selected reconfigurable intelligent surfaces of a predetermined configuration of said K reconfigurable intelligent surfaces, is strictly higher than a predetermined value limiting interference between additional multipath components generated by said at least one reconfigurable intelligent surface.

According to a particular aspect said electronic device is embeddable in a reconfigurable intelligent surfaces controller.

BRIEF DESCRIPTION OF THE DRAWINGS

The invention and its advantages will be better understood upon reading the following detailed description of a particular embodiment, given solely by way of a non-limiting example, wherein this description is made with reference to the appended drawings, wherein.

DETAILED DESCRIPTION

Figure 1:
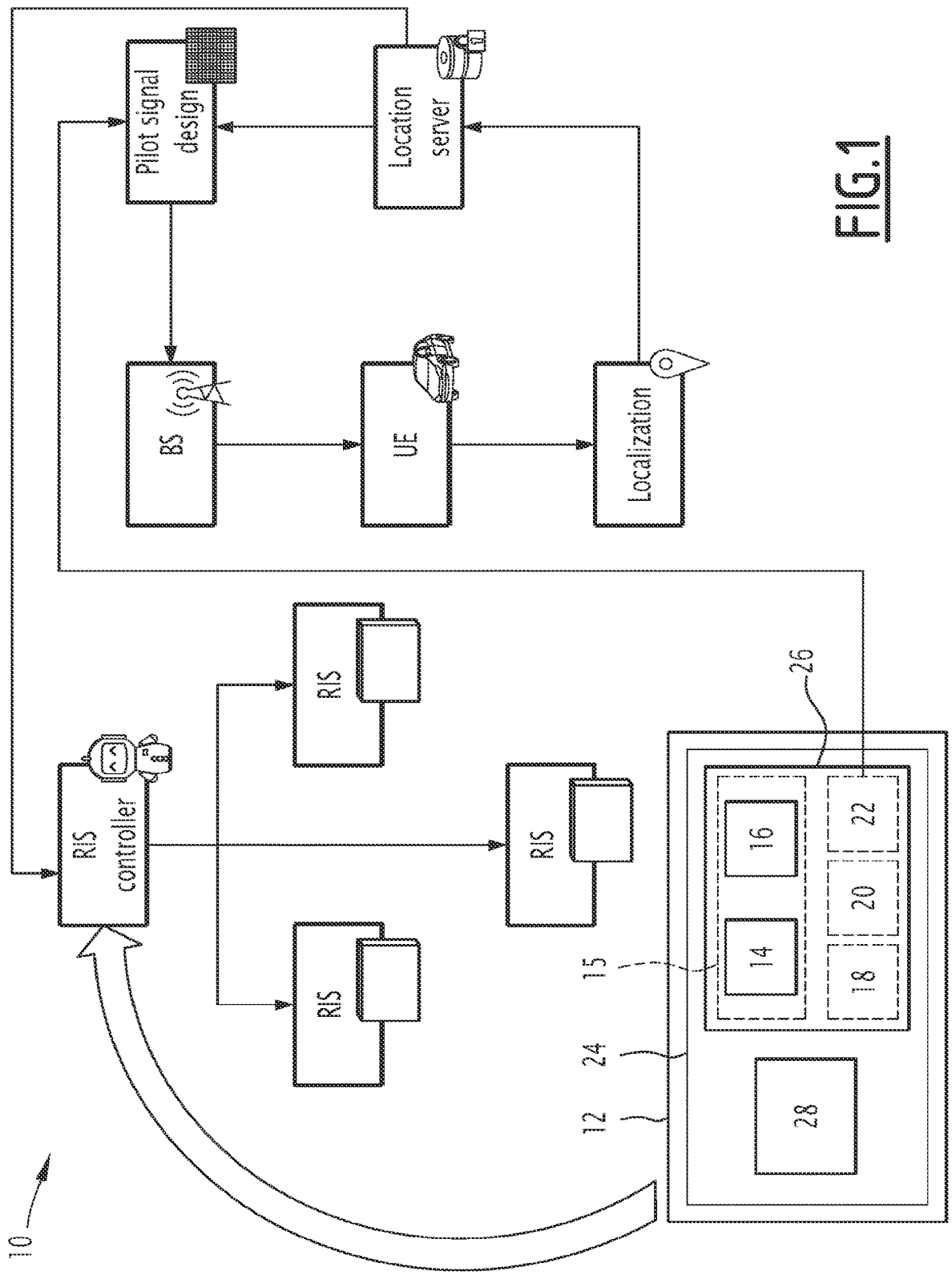
FIG. 1 shows a block representation of a system for RIS localization according to the invention.

An example of a system 10 for RIS localization according to the invention is illustrated by FIG. 1. More precisely, the generic architecture illustrated by FIG. 1 supports the particular case of downlink RIS-aided localization. Said system 10 comprises at least one base station BS and at least one user equipment UE (i.e. one mobile end user device) and a plurality of reconfigurable "intelligent" surfaces called RIS in the following, each RIS being made of discrete elements controllable in phase, said RISs being disseminated in a physical environment (e.g. in walls or on buildings, etc.)

On FIG. 1, for simplicity only three RISs are represented but such a representation is obviously not limiting, the collection of RISs comprising K RIS(s) with K an integer such that K≥1. According to the present invention, each RIS reflects (i.e. as a controllable electromagnetic mirror) the signal transmitted by the base station BS to the user equipment UE according to a downlink scenario, and inversely, according to an uplink scenario, the signal transmitted by a user equipment UE to a base station BS.

Advantageously, RISs indeed enable to shape the impinging electromagnetic waves and thus can control the wireless multipath channel between transmitting and receiving devices. Typically, RISs can create intentional anomalous reflections, where the direction of the reflected waves is no longer specular according to natural reflection laws, but steerable. RIS properties can be exploited in both far and nearfield domains (e.g., exploiting the curvature of radio waves). RISs are mainly intended to operate at high frequency (e.g. above 26 GHz) and can be implemented using a variety of technologies, like for instance, phased arrays, reflect-arrays, transmit-arrays, smart or programmable metasurfaces, large intelligent surface . . . ). RISs are seen as ultra low-cost and ultra low-consumption reflective relays, by controlling in real-time the RIS array elements (e.g., quantized phases) or the current distribution on a continuous metasurface.

Overall, in terms of system design, RISs offer the possibility to jointly optimize communicating devices within their radio environments (i.e., rather than trying to optimize the devices, given imposed environmental conditions). Thus, RIS properties make them particularly relevant and appealing for improving localization accuracy, flexibility and continuity through controlled multipath-aided approaches.

Considering a downlink scenario, the base station BS typically transmits downlink pilot signals to said at least one user equipment UE, said user equipment UE being for example on board a car or carried by a pedestrian. The user equipment UE to be positioned is configured to estimate multipath location-dependent radio variables out of downlink signals received from the base station BS.

The system 10 further comprises a location solver in charge of computing the UE locations out of estimated multipath location-dependent radio variables, for example using a localization module performing a positioning or tracking method (e.g., weighted least squares or Bayesian estimators).

In addition, said system 10 comprises a location server in charge of storing the computed UE locations provided by the localization module of the location solver for example.

Furthermore, said system 10 comprises a RIS controller in charge of activating and optimizing the RISs. According to various variants said RIS controller is embedded or not in said location server.

The estimated UE location information can be optionally re-injected to a pilot signal design apparatus to optimize the transmitted waveform and further improve the next localization steps.

According to the present invention, the RIS controller comprises an electronic device 12, wherein said device 12 comprises on the one hand a selecting module 14 configured to select at least one reconfigurable intelligent surface to activate among said K reconfigurable intelligent surfaces, and on the other hand, for example within a same optimization entity 15, a determining module 16 configured to determine phases of elements of said at least one reconfigurable intelligent surface to activate.

More precisely, said selecting module 14 and said determining module 16 are both run by minimizing a predetermined cost function depending on said a priori position of said user equipment, said predetermined cost function accounting for a predetermined position error bound of said user equipment, while also respecting two constraints:
  ensuring that at most K reconfigurable intelligent surfaces are selected,
  ensuring that the minimum Euclidean distance between two consecutive selected reconfigurable intelligent surfaces of a predetermined configuration of said K reconfigurable intelligent surfaces, is strictly higher than a predetermined value limiting interference between additional multipath components generated by said at least one reconfigurable intelligent surface.

According to a first embodiment, said selecting module 14 and said determining module 16 are configured to be run simultaneously by running said optimization entity 15.

According to a second embodiment, said selecting module 14 and said determining module 16 are configured to be run separately and successively. According to a particular aspect of this second embodiment said determining module 16 is run, before said selecting module 14, and for at least one reconfigurable intelligent surface previously imposed to said electronic device 12 taking into account said a priori position of said user equipment UE, and the selecting module 14 is configured to be run after said determining module 16, by optimizing said predetermined cost function using the phases of elements previously determined.

Optionally, said device 12 further comprises an activating module 18 configured to activate said at least one selected reconfigurable intelligent surface and to apply phases of elements provided by said determining of phases of elements of said at least one selected reconfigurable intelligent surface.

Optionally, said device 12 further comprises a new estimate receiving module 20 configured to request and receive a new estimate of said user equipment position determined by the localization module relying on at least one multipath location-dependent radio variables caused by said at least one selected reconfigurable intelligent surface with said provided phases of elements, and refining a latest known position of said user equipment with said new estimate of said user equipment position.

Optionally, said device 12 further comprises a repetition module 22 configured to run again the above-mentioned modules until at least one predetermined stopping rule is reached. In other words, said repetition module 22 is configured to evaluate if at least one predetermined stopping rule is reached, and if not to reiterate the steps performed by each of the above-mentioned modules.

In the example of FIG. 1, the electronic device 12 comprises an information processing unit 24, for example made up of a memory 26 and a processor 28 associated with the memory 26.

In the example of FIG. 1, the selecting module 14 and the determining module 16, as well as, optionally and additionally, the activating module 18, new estimate receiving module 20 and the repetition module 22, are each made in the form of a software component, executable by the processor 28. The memory 26 of the electronic device 12 is then capable of storing computing software configured to select at least one reconfigurable intelligent surface to activate among said K reconfigurable intelligent surfaces, determine phases of elements of said at least one reconfigurable intelligent surface to activate, by minimizing a predetermined cost function depending on said a priori position of said user equipment, said predetermined cost function accounting for a predetermined position error bound of said user equipment, while also ensuring that at most K reconfigurable intelligent surfaces are selected and ensuring that the minimum Euclidean distance between two consecutive selected reconfigurable intelligent surfaces of a predetermined configuration of said K reconfigurable intelligent surfaces, is strictly higher than a predetermined value limiting interference between additional multipath components generated by said at least one reconfigurable intelligent surface.

The processor 28 is then capable of executing each of the software applications from among the selecting software and the determining software, as well as, by way of optional addition, the activating software, the new estimate receiving software, and the repetition software.

In a variant that is not shown, the selecting module 14 and the determining module 16, as well as, optionally and additionally, the activating module 18, new estimate receiving module 20 and the repetition module 22, are each made in the form of a programmable logic component, such as an FPGA (Field Programmable Gate Array), or in the form of a dedicated integrated circuit, such as an ASIC (Applications Specific Integrated Circuit).

When the electronic device 12 is made, at least in part, in the form of one or several software programs, i.e. in the form of a computer program, it is further able to be stored on a medium, not shown, readable by computer. The computer-readable medium is for example a medium suitable for storing electronic instructions and able to be coupled with a bus of a computer system. As an example, the readable medium is an optical disc, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

Figure 2:
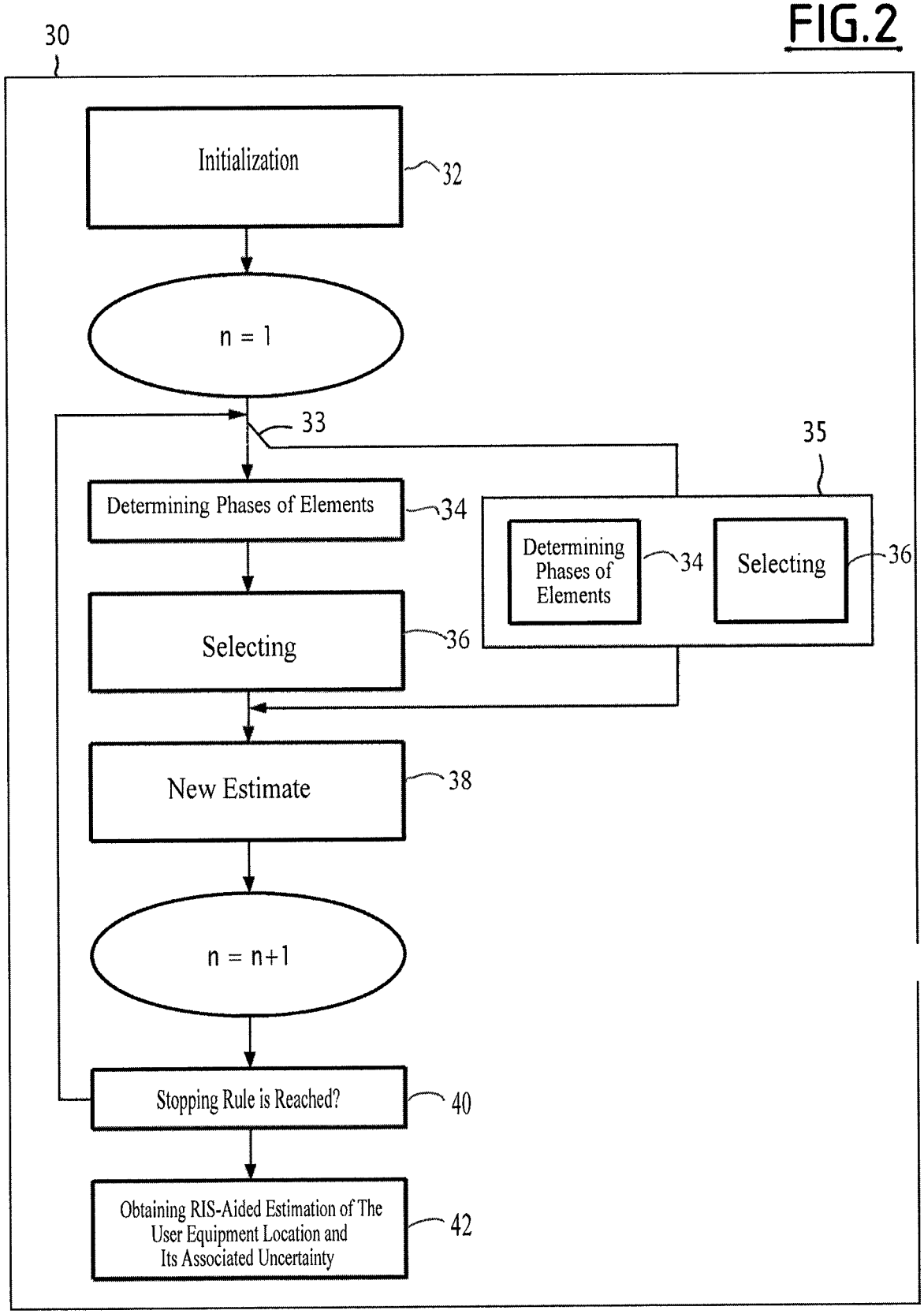
FIG. 2 shows a flowchart of the user equipment wireless localization method according to an embodiment of the present invention.

The operation of the electronic device 12 according to the invention, will now be explained using FIG. 2 showing a flowchart of the method 30, according to an embodiment of the invention, for optimizing user equipment wireless localization using K reconfigurable intelligent surfaces. with K an integer such that K≥1, each reconfigurable intelligent surface comprising M elements controllable in phase, with M an integer such that M≥1, said K reconfigurable intelligent surfaces reflecting signal(s) transmitted between a base station and said user equipment.

It has to be noted that such embodiment corresponds to an iterative embodiment of the method according to the present invention, but more generally, according to the present invention, all the embodiments of the proposed method comprises, whatever an a priori position of said user equipment UE (i.e. for any a priori position of said user equipment):
selecting at least one reconfigurable intelligent surface to activate among said K reconfigurable intelligent surfaces,
determining phases of elements of said at least one reconfigurable intelligent surface to activate,
by minimizing a predetermined cost function depending on said a priori position of said user equipment, said predetermined cost function accounting for a predetermined position error bound of said user equipment,
while also respecting two constraints:
ensuring that at most K reconfigurable intelligent surfaces are selected,
ensuring that the minimum Euclidian distance between two consecutive selected reconfigurable intelligent surfaces of a predetermined configuration of said K reconfigurable intelligent surfaces, is strictly higher than a predetermined value limiting interference between additional multipath components generated by said at least one reconfigurable intelligent surface.

In other words, said selecting and said determining steps are both performed to provide a solution to a same constrained optimization problem aiming at minimizing a predetermined cost function depending on said a priori position of said user equipment, said predetermined cost function accounting for a predetermined position error bound of said user equipment, while respecting two constraints corresponding to ensuring that at most K reconfigurable intelligent surfaces are selected on the one hand, and to ensuring that the minimum Euclidean distance between two consecutive selected reconfigurable intelligent surfaces of a predetermined configuration of said K reconfigurable intelligent surfaces, is strictly higher than a predetermined value limiting interference between additional multipath components generated by said at least one reconfigurable intelligent surface on the other hand.

In the embodiment of FIG. 2, the electronic device 12 acquires, during an optional initialization step 32, a prior knowledge of UE location and optionally an associated uncertainty at a time t−1, an iteration index n is then initialized to one.

During a following step, not represented, a choice is made thanks to switch 33 between two different embodiments of implementation of the two essential steps corresponding to said selecting and said determining steps, both performed to provide a solution to the same above-mentioned constrained optimization problem.

According to a first embodiment as activated on FIG. 2, a step 34 for determining phases of elements and a step 36 for selecting said at least one reconfigurable intelligent surface RIS to activate among said K reconfigurable intelligent surfaces are performed simultaneously by running a same optimization phase 35 of said predetermined cost function.

In other words, said first embodiment deals with a two-variables constrained optimization problem, which, for instance, can be expressed as following:

$$\underset{a,w}{\text{minimize}}\ P(X\mid a, w)$$

$$\text{such that } 1^T a \leq \overline{K}$$

$$d_{min}(a) > c/(WD)$$

where:
$\overline{K} \leq K$ is the maximum number of reconfigurable intelligent surfaces that can be controlled simultaneously at a time, with K the total number of reconfigurable intelligent surfaces deployed in the considered environment of said user equipment UE, a=[$a_1$, ..., $a_K$] an RIS activation vector, where $a_k \in \{0,1\}$ denotes if the k-th RIS of a predetermined configuration of said K reconfigurable intelligent surfaces is activated, for instance, when $a_k=1$ or not when $a_k=0$, said predetermined configuration of said K reconfigurable intelligent surfaces imposing a pre-established and immutable order of the elements of the activation vector a, and thus of the RISs, for example, according to the order of the received reflections/multipaths, w=[$w_1^T$, ..., $w_K^T$] is a matrix collecting the transpose, symbolized by the T exponent, of the RIS phase vectors, with, for the k-th RIS, $w_k$=diag($\Omega_k$) with $\Omega_k$=diag($e^{jw_{k,0}}$, ..., $e^{jw_{k,M-1}}$), $w_k$ being equal to $1_M$ if the k-th RIS is not activated (i.e. when $a_k=0$), with M the number of discrete elements controllable in phase per RIS, the inactivated k-th RIS behaving therefore as an omnidirectional reflector, whereas $w_k$ being optimized according to the localization performance otherwise (i.e. when $a_k=1$), X is the a priori position of said user equipment UE, and for example, considering the embodiment of FIG. 2, corresponds to the latest known user equipment UE location optionally derived from said prior information 32 or previous estimation from 38 as detailed later, and is a vector X=[x, y] containing such a latest known user equipment UE cartesian coordinates, $d_{min}$(a):$\{0,1\}^K \rightarrow N$, with N the set of natural numbers, $d_{min}$ being a function returning the minimum index-wise distance between two consecutive activated (i.e. selected to be activated) RIS in said RIS activation vector a (e.g. $d_{min}$([101])=2), W represents the bandwidth of the transmitted a signal to be reflected by said at least one reconfigurable intelligent surface selected among said K reconfigurable intelligent surfaces and D a predetermined fixed spacing between each reconfigurable intelligent surfaces of said K reconfigurable intelligent surfaces. In other words, the second constraint of the above formulated constrained optimization problem ensures that the minimum index-wise distance between two consecutive selected reconfigurable intelligent surfaces of a predetermined configuration of said K reconfigurable intelligent surfaces, is strictly higher than a predetermined value limiting interference between additional multipath components generated by said at least one reconfigurable intelligent surface, and in particular said predetermined value is inversely proportional to a product of a predetermined fixed spacing between each reconfigurable intelligent surfaces of said K reconfigurable intelligent surfaces by a predetermined bandwidth of a signal to be reflected by said at least one reconfigurable intelligent surface selected among said K reconfigurable intelligent surfaces, P is the cost function to minimize said predetermined cost function accounting for a predetermined position error bound of said user equipment UE.

In the expression "two-variables constrained optimization problem", the "two-variables" correspond, on the one hand, to the variable a corresponding to a vector, and on the other hand, to the variable w corresponding to a matrix as defined above.

It has to be noted that the proposed method is performed based on a cost objective, which is in theory a function of the exact position of said user equipment, which in fine is also exactly the unknown quantity that the proposed aimed at estimating through RIS-based localization, and to avoid a chicken-and-egg problem, it is first proposed to substitute the exact position by an estimate in the predetermined cost function P, thus opening the floor to iterative refinements as described in relation with the following steps of FIG. 2, or alternatively, to substitute the exact position by a statistical quantity computed over a known prior density of the user equipment UE position (e.g., if the prior UE location is known a priori within a certain region). RIS selection is thus meant to achieve refined location information through RIS-based localization, beyond this prior knowledge.

According to a first variant, said predetermined cost function P is based on first positioning performance indicators and/or metrics characterizing the quality of an upcoming position estimate of said user equipment based on at least one multipath component observed on the received signal and caused by said at least one selected reconfigurable intelligent surfaces, and belonging to the group comprising at least:

a function of a Fisher information,
a Cramer Rao lower bound,
a Ziv-Zakai bound,
a geometric dilution of precision.

For example, $P(X|a,w) = \sqrt{tr(J^{-1}(X))}$, where $J^{-1}$ is the inverse of the Fisher information matrix characterizing the quality of an upcoming position estimate of said user equipment, approximated for instance by substituting the exact position X of said user equipment by the latest known position of said user equipment.

According to a second variant, said predetermined cost function P is based on second positioning performance indicators and/or metrics characterizing the estimation of at least one or several intermediary location-dependent radio variables associated with at least one multipath component observed on the received signal and caused by said at least one selected reconfigurable intelligent surfaces, the said location-dependent radio variables belonging to the group comprising:

delay,
angle of arrival,
received power or amplitude
or some combination of the latter.

According to a particular aspect common to the above two variants, said first positioning performance indicators, or respectively said second positioning performance indicators, are approximated by injecting information representative of a latest known position of said user equipment, said information representative of said latest known position of said user equipment corresponding for example typically to a previous estimate and/or possibly, to any a priori information about this said latest known position (e.g., presumed uncertainty on this previous estimate, or probable region of presence, etc.).

Advantageously, the first constraint $1^T a \leq K$ is intended to preserve low complexity, whereas the second constraint $d_{min}(n(a)) > c/(WD)$ enables to mitigate inter-path interference, by limiting the risk to get unresolvable RIS paths at the receiver in the delay domain.

According to a second embodiment as inactivated on FIG. 2 thanks to the switch 33, said step 34 of determining phases of elements and said step 36 of selecting of said at least one reconfigurable intelligent surface to activate among said K reconfigurable intelligent surfaces are performed separately and successively, said determining 34 of phases of elements being first performed for at least one reconfigurable intelligent surface previously imposed to said electronic device (in the sense, virtually activated) taking into account said a priori position of said user equipment, said selecting 36 being then performed by optimizing said predetermined cost function using the phases of elements previously determined.

Figure 3:
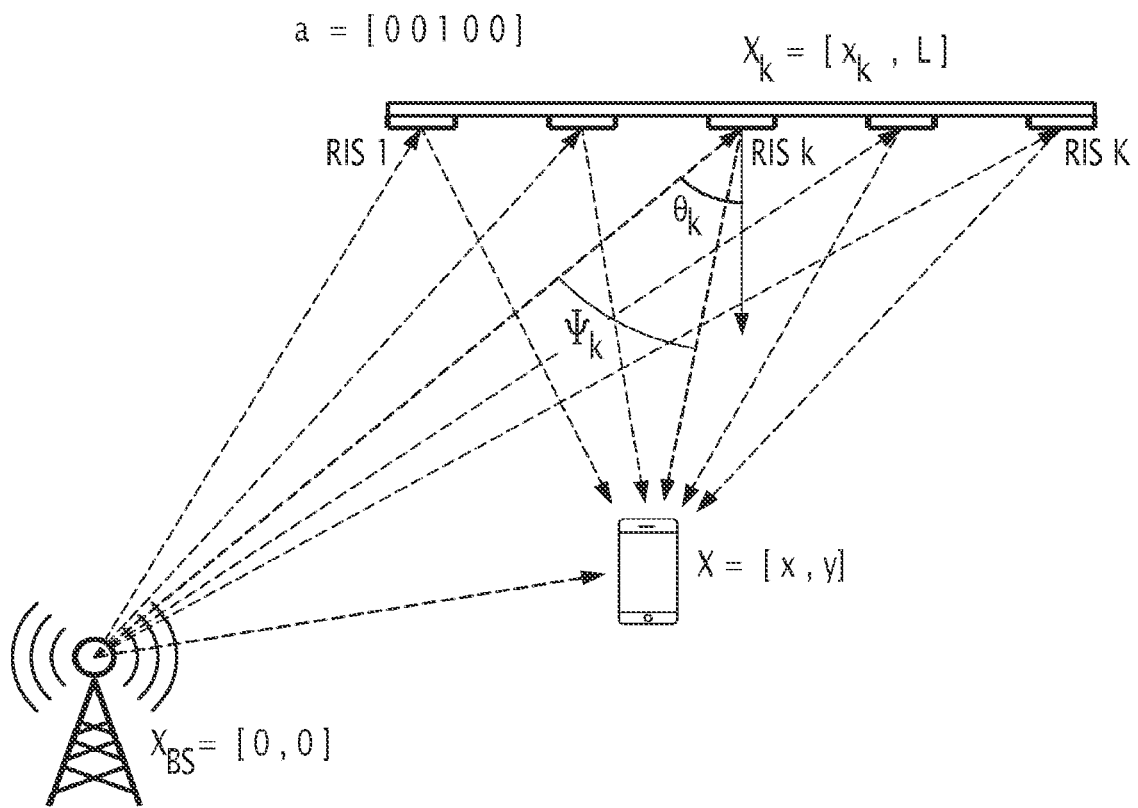
FIG. 3 illustrates an example of RIS-aided positioning scenario according to the invention.
Figure 4:
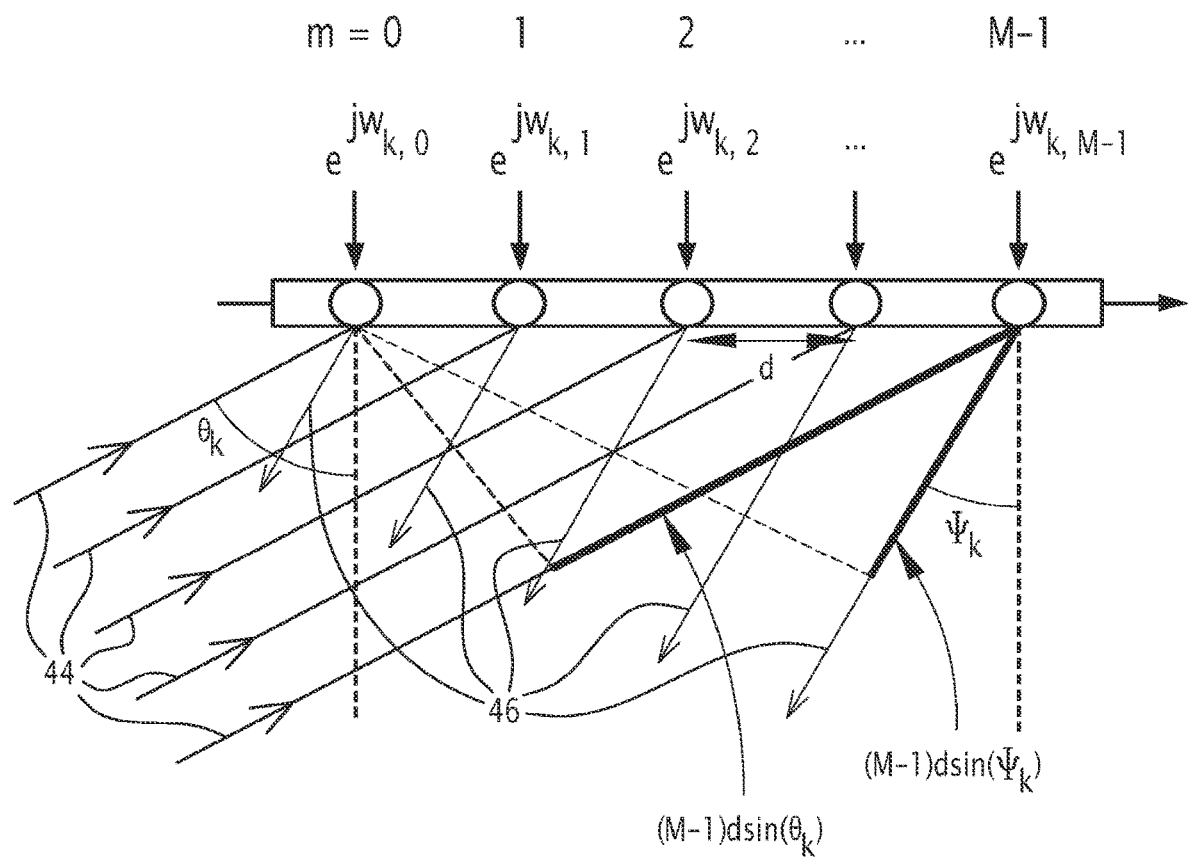
FIG. 4 illustrates the behavior of one particular RIS selected and activated according to the invention.

More precisely, in this second embodiment a two-step approach is performed by considering, in comparison with the first above-mentioned embodiment that said determining 34 of phases of elements is performed considering a given imposed activation vector a. The optimization over w is then straightforward. Indeed, when $a_k=1$, the phase term at the m-th element of the k-th activated RIS is equal to:

$w_{k,m} = -\pi m(\sin(\theta_k) + \sin(\psi_k))$ where $\theta_k$ denotes the angle of arrival (AOA) of the signal from the base station to the considered RIS according to the given imposed activation vector a, and where $\psi_k$ denotes the angle of departure (AOD) from said considered RIS to the user equipment UE as illustrated by FIGS. 3 and 4 described in the following.

Accordingly, the energy of a path reflected by an active RIS is maximized at the receiving user equipment UE, improving the estimation of the location-dependent radio variables associated with that received multipath component, and thus ultimately, improving the estimation of UE's position based on these radio parameters. In other words, according to this second embodiment, the RIS optimization naturally results in concentrating the reflected signal energy towards the user equipment UE.

In addition, such two-steps approach results in simplifying the initial two-variables constrained optimization problem associated with the previous first embodiment into a single-variable constrained optimization problem, which, for instance, can be expressed as following:

$$\underset{a}{\text{minimize}}\ P(X \mid a, w(a))$$
$$\text{such that } 1^T a \leq \overline{K}$$
$$d_{min}(a) > c/(WD)$$

which is combinatorial in nature.

According to said second embodiment, for a small value of K, optimizing over said activation vector a can be simply achieved through exhaustive search. RIS selection 36 thus consists in determining the RIS subset that provides the best relative geometric configuration from a positioning standpoint, given an approximated UE location, whereas RIS phases optimization resulting from the determining step 34 improves the signal-to-interference-plus-noise ratio (SINR) at the user equipment UE.

It has to be noted that all considerations on said predetermined cost function P previously developed in relation with the previous first embodiment are also applicable to said second embodiment.

Moreover it has to be noted that said first or second embodiment could be performed as such, as a single-shot method, but according to the embodiment illustrated by FIG. 2 the steps associated with said first or second embodiment are included in an iterative refinement process by reusing the corresponding UE's position estimation.

More precisely, following said steps 34 and 36, respectively for determining phases of elements, and for selecting said at least one reconfigurable intelligent surface RIS to activate among said K reconfigurable intelligent surfaces, according to anyone of said first embodiment, a non represented resulting step is performed by the activating module 18, said resulting step consisting in activating said at least one selected reconfigurable intelligent surface and applying phases of elements provided by said determining of phases of elements of said at least one selected reconfigurable intelligent surface.

During a step 38, said localization module of the location solver determines a new estimate of said user equipment position relying on at least one multipath location-dependent radio variables caused by said at least one selected reconfigurable intelligent surface with said provided phases of elements, refines a latest known position of said user equipment with said new estimate of said user equipment position and provides it to the new estimate receiving module 20.

According to a particular optional and additional aspect, said determining 38 of a new estimate is based on determining location-dependent radio variables associated with at least one multiple multipath parameter out of signals received by said at least one selected reconfigurable intelligent surface belonging to the group comprising at least:
delay(s),
angle(s) of arrival,
received power,
and said predetermined cost function P depends on said at least one multiple multipath parameter.

According to another particular optional and additional aspect, said determining 38 of a new estimate of said user equipment position relying on at least one multipath location-dependent radio variables, comprises performing one estimator belonging to the group comprising at least:
weighted least squares positioning,
Maximum likelihood positioning,
Maximum a posteriori positioning,
Bayesian filtering,
message-passing over factor-graphs.

After refining said latest known position of said user equipment with said new estimate of said user equipment position during step 38, the iteration index n is then incremented such that n=n+1.

During the following step 40, the repetition module 22 evaluates if at least one predetermined stopping rule is reached, and if not reiterates the steps 34, 36, 38 performed previously.

In particular, said at least one predetermined stopping rule belongs to the group comprising at least:
reaching an a priori accuracy position target (e.g., based on the optimized performance indicators characterizing the estimation of said user position),
reaching an a priori maximum number of activated reconfigurable intelligent surfaces,
reaching an a priori maximum number of refinement iterations/steps of said method.

In step 42, when said at least one predetermined stopping rule is reached, a RIS-aided estimation of the user equipment location and its associated uncertainty at time t is then obtained.

FIG. 3 illustrates an example of RIS-aided positioning scenario with a downlink transmission from a base station BS, the position of which is $X_{BS}=[0,0]$ to a user equipment UE for example a mobile terminal, the position of which is X=[x, y], said scenario involving five reconfigurable intelligent surfaces (i.e. K=5) according to the present invention.

On said FIG. 3, the line-of-sight (LOS) between said base station BS and said user equipment UE is represented along with multiple path via a surface equipped with said five reconfigurable intelligent surfaces.

On FIG. 3, the result provided by a selecting step 36 of a single-shot method according to one of said above-mentioned first or second embodiments is illustrated and corresponds to the activation vector a=[00100], that is to say to the selection of the third central reconfigurable intelligent surface $RIS_{k=3}$, the position of which is $X_{k=3}=[x_k, L]$, K−1=4 reconfigurable intelligent surface remaining thus inactivated (i.e. not selected) and consequently uncontrolled. On FIG. 3, $\theta_k$ denotes the angle of arrival (AOA) of the signal from the base station BS to the considered $RIS_{k=3}$ according to the resulting activation vector a=[00100], and where $\psi_k$ denotes the angle of departure (AOD) from said considered $RIS_{k=3}$ to the user equipment UE.

FIG. 4 illustrates the behavior of one particular RIS selected, activated and the beam of which is optimized and controlled according to the present invention, corresponding for example to the central $RIS_{k=3}$ of FIG. 3. More precisely, said $RIS_{k=3}$ comprises M elements controllable in phase, with M an integer such that M≥1.

More precisely, said activated $RIS_{k=3}$ is optimized by said determining 34 of phases of its elements performed, for example according to the second embodiment, considering the given imposed activation vector a=[00100] of FIG. 3. The optimization over w is indeed then straightforward, the phase term at the $(M-1)^{th}$ element of the third (k=3) activated RIS is equal to: $w_{k,M-1}=-\pi(M-1)(\sin(\theta_k)+\sin(\omega_k))$ where $\theta_k$ denotes the angle of arrival (AOA) of the incoming signal 44 from the base station to the considered RIS according to the given imposed activation vector a, and where $\psi_k$ denotes the angle of departure (AOD) of the reflected signal 46 from each elements controllable in phase of said considered RIS to the user equipment UE, and where d denotes the interspace between each element controllable in phase.

Figure 5:
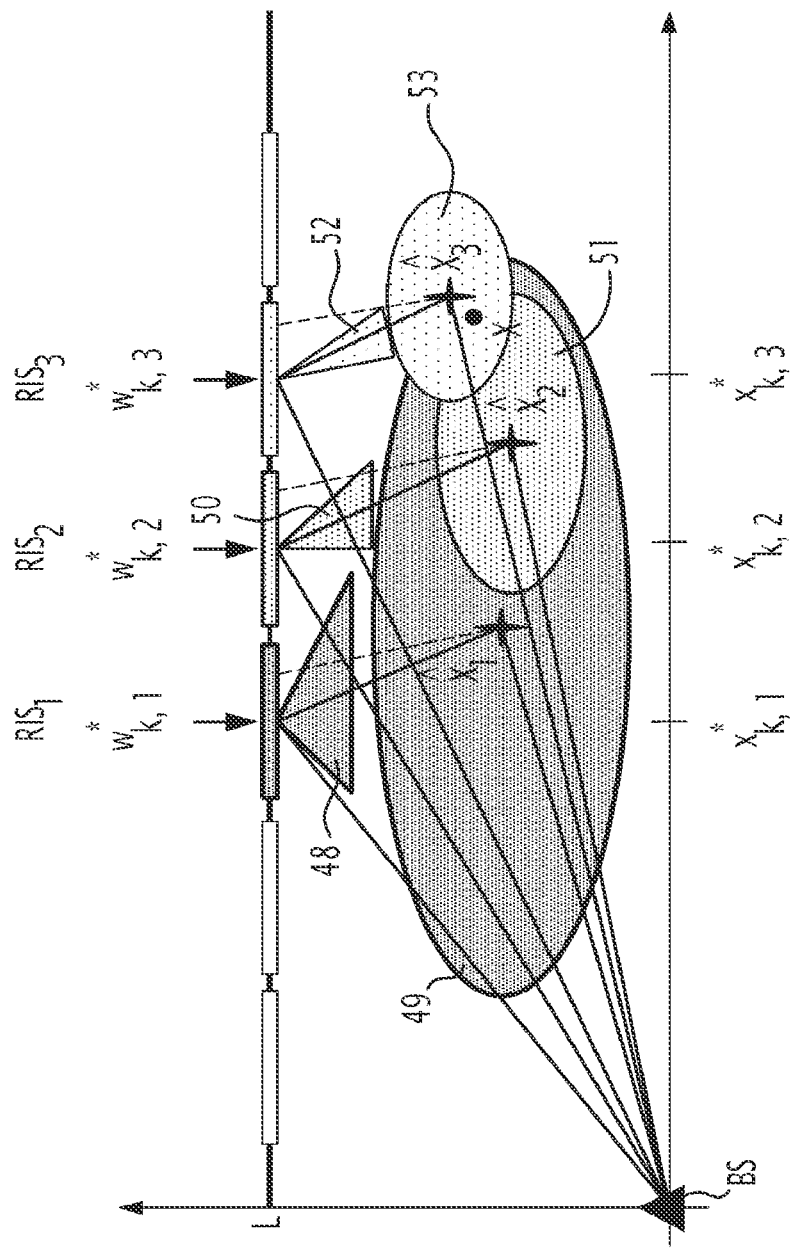
FIG. 5 illustrates an example of three consecutive localization results provided by three consecutive iterations of steps of the user equipment wireless localization method according to an embodiment of the present invention.

FIG. 5 illustrates an example of three consecutive localization results provided by three consecutive iterations of the sequence of steps 34, 36, 38 of the user equipment wireless localization method according to the iterative embodiment of the present invention illustrated by FIG. 2.

According to the first iteration n=1, the localization procedure leads to the position $\hat{x}_{121}$ associated with the uncertainty 49, the $RIS_1$ is consequently first selected with the results of the RIS optimization method according to the present invention corresponding to the phase $\Omega_{k11,1}^*$, the beam 48, and the corresponding position $x_{k,1}^*$ During the second iteration n=2, the localization procedure leads to the position $\hat{x}_2$ associated with the smaller uncertainty 51 in comparison with the previous uncertainty 49 associated with the first iteration, the $RIS_2$ is consequently selected with the results of the RIS optimization method according to the present invention corresponding to the phase $\Omega_{k,2}^*$, the narrower beam 50 in comparison with the beam 48 associated with the first iteration, and the corresponding position $x_{k,2}^*$.

During the third iteration n=3, the localization procedure leads to the position $\hat{x}_3$ associated with the smaller uncertainty 53 in comparison with the previous uncertainty 51 associated with the second iteration, the $RIS_3$ is consequently selected with the results of the RIS optimization method according to the present invention corresponding to the phase $\Omega_{k,3}^*$, the narrower beam 52 in comparison with the beam 50 associated with the second iteration, and the corresponding position $x_{k,3}^*$ nearer to the exact position X of the user equipment.

In other words, starting with a-possibly poor/coarse— initial knowledge of the UE location, after a few iterations, the reflected beam direction (and possibly, the reflected beam width) at the RIS can be controlled to get more and more adapted to the current direction/location and location uncertainty of the UE. This iterative process can stop either after reaching a maximum tolerated number of iterations (e.g., in compliance with expected UE mobility) or after reaching a certain location uncertainty level (as perceived by the system, for instance based on the same theoretical performance bounds as that used for RIS optimization).

Thus, the electronic device 12 and the method for optimizing user equipment wireless localization using K reconfigurable intelligent surfaces according to the invention make it possible to jointly down-selects, activates and controls a subset of RISs (i.e., among all the RISs deployed in a given environment) so as to optimize localization performance, whatever the position of the mobile user/device.

More particularly, given the coarse prior knowledge of the latter UE position and under complexity constraints (i.e., a maximum number of controlled RIS at the same time), the present solution makes it possible to dynamically/iteratively activate only the most informative RISs (i.e., the ones that generate the most useful multipath information with respect to localization, typically in terms of geometric dilution of precision or theoretical positioning error bounds), and also to control the phases of activated RISs, typically, so as to optimize the beam direction/width of reflected waves in the user equipment UE direction, so as to increase the signal-to-noise ratio (SNR) while limiting inter-path interference.

The invention claimed is:

1. A method for optimizing user equipment wireless localization using K reconfigurable intelligent surfaces, with K an integer such that K≥1, each reconfigurable intelligent surface comprising M elements controllable in phase, with M an integer such that M≥1, said K reconfigurable intelligent surfaces reflecting signals transmitted between a base station and said user equipment, said method being implemented by an electronic device and said method comprising, regardless of an a priori position of said user equipment:
  selecting at least one reconfigurable intelligent surface to activate among said K reconfigurable intelligent surfaces, and
  determining phases of elements of said at least one selected reconfigurable intelligent surface to activate, by minimizing a predetermined cost function depending on said a priori position of said user equipment, said predetermined cost function accounting for a predetermined position error bound of said user equipment, while
  ensuring that no more than K reconfigurable intelligent surfaces are selected, and
  ensuring that a minimum Euclidian distance between two consecutive selected reconfigurable intelligent surfaces of a predetermined configuration of said K reconfigurable intelligent surfaces, is greater than a predetermined value limiting interference between additional multipath components generated by said at least one selected reconfigurable intelligent surface.

2. The method according to claim 1, wherein said determining of phases of elements and said selecting of said at least one reconfigurable intelligent surface to activate among said K reconfigurable intelligent surfaces are performed simultaneously by running a same optimization phase of said predetermined cost function.

3. The method according to claim 1, wherein
  said determining of phases of elements and said selecting of said at least one reconfigurable intelligent surface to activate among said K reconfigurable intelligent surfaces are performed separately and successively, said determining of phases of elements being first performed for at least one reconfigurable intelligent surface previously imposed to said electronic device taking into account said a priori position of said user equipment, and said selecting being then performed by optimizing said predetermined cost function using the phases of elements previously determined.

4. The method according to claim 1, wherein said predetermined value is inversely proportional to a product of a predetermined fixed spacing between each reconfigurable intelligent surface of said K reconfigurable intelligent surfaces by a predetermined bandwidth of a signal to be reflected by said at least one selected reconfigurable intelligent surface selected among said K reconfigurable intelligent surfaces.

5. The method according to claim 1, wherein said predetermined cost function is based on first positioning performance indicators and/or metrics characterizing a quality of an upcoming position estimate of said user equipment based on at least one multipath component observed on a received signal and caused by said at least one selected reconfigurable intelligent surface, and belonging to a group comprising at least:
a function of a Fisher information,
a Cramer Rao lower bound,
a Ziv-Zakai bound, and
a geometric dilution of precision.

6. The method according to claim 1, wherein said predetermined cost function is based on second positioning performance indicators and/or metrics characterizing estimation of at least one intermediary location-dependent radio variable associated with at least one multipath component observed on a received signal and caused by said at least one selected reconfigurable intelligent surface, the at least one location-dependent radio variable belonging to a group comprising a delay, an angle of arrival, and a received power or amplitude.

7. The method according to claim 5, wherein said first positioning performance indicators, or respectively second positioning performance indicators, are approximated by injecting information representative of a latest known position of said user equipment.

8. The method according to claim 1, wherein said method further comprises:
activating said at least one selected reconfigurable intelligent surface and applying phases of elements provided by said determining of phases of elements of said at least one selected reconfigurable intelligent surface, and
determining a new estimate of said user equipment position relying on at least one multipath location-dependent radio caused by said at least one selected reconfigurable intelligent surface with said provided phases of elements, and refining a latest known position of said user equipment with said new estimate of said user equipment position,
wherein all steps of said method are reiterated until at least one predetermined stopping rule is reached.

9. The method according to claim 8, wherein said determining of the new estimate is based on determining location-dependent radio variables associated with at least one multiple multipath parameter out of signals received by said at least one selected reconfigurable intelligent surface belonging to a group comprising at least:
one or more delays,
one or more angles of arrival, and
a received power, and
wherein said predetermined cost function depends on said at least one multiple multipath parameter.

10. The method according to claim 8, wherein said determining of the new estimate of said user equipment position relying on at least one multipath location-dependent radio variable, comprises performing one estimator belonging to a group comprising at least:
weighted least squares positioning,
Maximum likelihood positioning,
Maximum a posteriori positioning, Bayesian filtering, and
message-passing over factor-graphs.

11. The method according to claim 8, wherein said at least one predetermined stopping rule belongs to a group comprising at least:
reaching an a priori accuracy position target,
reaching an a priori maximum number of activated reconfigurable intelligent surfaces, and
reaching an a priori maximum number of refinement iterations/steps of said method.

12. A non-transitory computer-readable medium comprising software instructions which, when executed by a computer, cause the computer to perform the a method for optimizing user equipment wireless localization using the K reconfigurable intelligent surfaces according to claim 1.

13. An electronic device for optimizing user equipment wireless localization using K reconfigurable intelligent surfaces, with K an integer such that K≥1, each reconfigurable intelligent surface comprising M elements controllable in phase, with M an integer such that M≥1, said K reconfigurable intelligent surfaces reflecting signals transmitted between a base station and said user equipment, said electronic device comprising circuitry configured to, regardless of a priori position of said user equipment:
select at least one reconfigurable intelligent surface to activate among said K reconfigurable intelligent surfaces, and
determine phases of elements of said at least one selected reconfigurable intelligent surface to activate, by minimizing a predetermined cost function depending on said a priori position of said user equipment, said predetermined cost function accounting for a predetermined position error bound of said user equipment, while
ensuring that no more than K reconfigurable intelligent surfaces are selected, and
ensuring that a minimum Euclidian distance between two consecutive selected reconfigurable intelligent surfaces of a predetermined configuration of said K reconfigurable intelligent surfaces, is greater than a predetermined value limiting interference between additional multipath components generated by said at least one selected reconfigurable intelligent surface.

14. The electronic device according to claim 13, wherein said electronic device is embeddable in a reconfigurable intelligent surface controller.

* * * * *